United States Patent
Delhaye et al.

(10) Patent No.: US 11,172,697 B2
(45) Date of Patent: Nov. 16, 2021

(54) METHOD FOR PREPARING A CARBOHYDRATE AND/OR PROTEIN PRODUCT

(71) Applicant: TUN FOOD INNOVATION B.V., Venlo (NL)

(72) Inventors: Jeffry Raymond Steve Delhaye, Venlo (NL); Peter Gerardus Hubertus Marie Pijls, Venlo (NL); Reinier Ronald Van Der Hoeven, Venlo (NL); Gerardus Reinier Van Der Hoeven, Venlo (NL)

(73) Assignee: Tun Food Innovation B.V., Venlo (NL)

( * ) Notice: Subject to any disclaimer, the term of this patent is extended or adjusted under 35 U.S.C. 154(b) by 151 days.

(21) Appl. No.: 16/462,472

(22) PCT Filed: Nov. 21, 2017

(86) PCT No.: PCT/NL2017/050760
§ 371 (c)(1),
(2) Date: May 20, 2019

(87) PCT Pub. No.: WO2018/097712
PCT Pub. Date: May 31, 2018

(65) Prior Publication Data
US 2019/0320697 A1 Oct. 24, 2019

(30) Foreign Application Priority Data
Nov. 22, 2016 (NL) ...................... 1042159

(51) Int. Cl.
*A23L 13/60* (2016.01)
*A23L 13/40* (2016.01)
(Continued)

(52) U.S. Cl.
CPC ................. *A23L 13/60* (2016.08); *A23L 3/01* (2013.01); *A23L 5/15* (2016.08); *A23L 5/34* (2016.08);
(Continued)

(58) Field of Classification Search
CPC ........ A23L 13/60; A23L 13/426; A23L 13/52; A23L 17/40; A23L 17/70; A23L 35/10; A23L 5/15; A23L 13/43; A23L 19/13; A23L 29/206; A23L 29/231; A23L 7/117; A23L 7/161; A23L 19/09; A23L 13/50; A23L 3/01; A23L 5/34; A23L 29/10;
(Continued)

(56) References Cited

U.S. PATENT DOCUMENTS 3,520,701 A   7/1970   Rendek et al.
3,978,244 A   8/1976   Louis
(Continued)

FOREIGN PATENT DOCUMENTS

EP   0848912           6/1998
EP   2762013 A1 *   8/2014   ............. A23L 19/09
(Continued)

*Primary Examiner* — Drew E Becker
(74) *Attorney, Agent, or Firm* — Occhiuti & Rohlicek LLP

(57) ABSTRACT

The invention relates to method and a device for preparing a carbohydrate and/or protein product by subjecting a carbohydrate and/or protein to a heat treatment after a few ingredients have been added.

15 Claims, 1 Drawing Sheet

(51) Int. Cl.

| | | |
|---|---|---|
| *A23P 30/38* | (2016.01) | |
| *A23L 13/50* | (2016.01) | |
| *A23L 17/40* | (2016.01) | |
| *A23L 17/00* | (2016.01) | |
| *A23L 19/18* | (2016.01) | |
| *A23L 35/00* | (2016.01) | |
| *A23L 5/10* | (2016.01) | |
| *A23L 19/12* | (2016.01) | |
| *A23L 5/30* | (2016.01) | |
| *A23L 19/00* | (2016.01) | |
| *A23L 3/01* | (2006.01) | |
| *A23L 29/206* | (2016.01) | |
| *A23L 7/117* | (2016.01) | |
| *A23L 29/231* | (2016.01) | |
| *A23L 7/161* | (2016.01) | |

(52) U.S. Cl.
CPC ............... *A23L 7/117* (2016.08); *A23L 7/161* (2016.08); *A23L 13/426* (2016.08); *A23L 13/43* (2016.08); *A23L 13/50* (2016.08); *A23L 13/52* (2016.08); *A23L 17/40* (2016.08); *A23L 17/70* (2016.08); *A23L 19/09* (2016.08); *A23L 19/12* (2016.08); *A23L 19/13* (2016.08); *A23L 19/19* (2016.08); *A23L 29/206* (2016.08); *A23L 29/231* (2016.08); *A23L 35/10* (2016.08); *A23P 30/38* (2016.08); *A23V 2002/00* (2013.01)

(58) Field of Classification Search
CPC .......... A23L 19/12–19/19; A23P 30/38; A23V 2002/00; A23J 3/26

USPC .......... 426/241–243, 602–607, 637, 518–520
See application file for complete search history.

(56) References Cited

U.S. PATENT DOCUMENTS

| | | | | |
|---|---|---|---|---|
| 4,045,583 | A * | 8/1977 | Jeffery | A23G 3/346 |
| | | | | 426/241 |
| 6,890,580 | B1 * | 5/2005 | Villagran | A23B 7/02 |
| | | | | 426/473 |
| 2003/0091698 | A1 | 5/2003 | Marsland | |
| 2007/0092619 | A1 * | 4/2007 | Ning | A21D 2/261 |
| | | | | 426/549 |
| 2008/0182004 | A1 * | 7/2008 | Baker | A23L 7/126 |
| | | | | 426/560 |
| 2009/0202700 | A1 * | 8/2009 | Bunke | A21D 10/025 |
| | | | | 426/549 |
| 2014/0093617 | A1 * | 4/2014 | Hynes | A23L 7/117 |
| | | | | 426/89 |
| 2018/0000117 | A1 * | 1/2018 | Snappe | A23L 7/117 |
| 2018/0000149 | A1 * | 1/2018 | Desjardins-Lavisse | A23P 30/32 |
| 2019/0159477 | A1 * | 5/2019 | Snappe | A23J 3/225 |

FOREIGN PATENT DOCUMENTS

| | | |
|---|---|---|
| GB | 2459575 | 11/2009 |
| GB | 2489972 | 10/2012 |
| WO | 2003024254 | 3/2003 |

\* cited by examiner

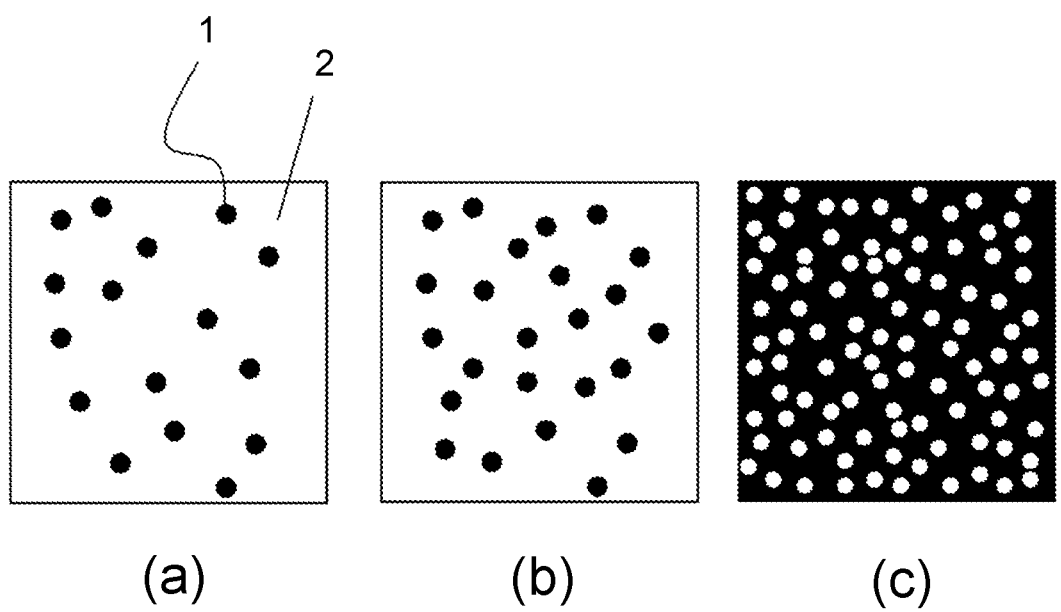

METHOD FOR PREPARING A CARBOHYDRATE AND/OR PROTEIN PRODUCT

CROSS REFERENCE TO RELATED APPLICATIONS

This application is a National Phase under 35 U.S.C. 371 of International Application No. PCT/NL2017/050760 filed on Nov. 21, 2017, which claims priority to Dutch Application No. 1042159 filed Nov. 22, 2016, the contents of all of which are hereby incorporated by reference in their entireties.

FIELD OF THE INVENTION

The invention relates to a method and device for preparing carbohydrate and protein products by subjecting carbohydrate and protein products to a heat treatment after having added a few ingredients, and to a carbohydrate and protein product.

BACKGROUND OF THE INVENTION

Methods for preparing carbohydrate and protein products by subjecting carbohydrate and protein products to a heat treatment, optionally after having added a few ingredients, are known. GB2489972A describes a method for making an expanded or puffed high-protein snack product or crisp comprising a) mixing together water, protein and emulsifying salts in a mixer, b) heating the mixture in a pre-heated mixer and adding starch, c) mixing until all free water is absorbed, d) adding a preservative, e) chilling the mixture and cutting it into pieces and f) expanding the mixture by heating in a microwave. The protein may be rennet casein and the starch may be derived from maize.

US2003/0091698 describes a high-protein, reduced carbohydrate food material technology and high-protein, reduced carbohydrate food products made therefrom, in which the food products meet high organoleptic, stability and taste/texture standards. The material technology allows for the processing of proteinaceous foods on common process equipment, the foods including but not limited to chips, snacks, crackers, wafers, bars, flat breads, cookies, biscuits, breads, bagels, cakes, waffles, pancakes, French fries, pasta, pizza dough, breakfast cereals, muffins, donuts, pastries, and meat analogs. The material is an edible dough that possesses the material characteristics necessary for numerous industrial food processes, including sheeting, extrusion, die cutting, and rotary molding, followed by one or more of baking, drying, microwaving, boiling, steaming, frying, seasoning, and enrobing.

SUMMARY OF THE INVENTION

In GB2489972A and US2003/0091698 as well as in other prior art methods, powders such as flower, concentrates, isolates (both in native and modified form) are usually started from as raw material. Obtaining these dry powders usually requires energy-consuming treatment steps, which in addition may have a negative effect on the nutritional and functional properties of the raw material.

Of methods for preparing carbohydrate and protein products using a heat treatment, various methods that start from fresh raw materials are also known. A very well-known example is cooking white meat, red meat, shrimps and fish, mushrooms and vegetables harvested from the land, for instance types of cabbages, leaf vegetables and types of tubers, sea vegetables for instance seaweeds and algae, fruit, fruits, nuts and cereals, for instance by boiling/cooking, steaming, frying, smoking, grilling, roasting or baking. For that purpose, a whole range of equipment is known, including an oven, grill, smoking installation, barbecue, cooking-range and microwave oven.

The shelf life and/or retardation of the deterioration process of these products is limited when stored in a refrigerator and can vary from several days up to several weeks. In case of vacuum packaging and/or storage in the freezer this period can be several months. When packaging red meat, white meat, fish and crustaceans, fruit and vegetables in cans or in glass jars, a shelf life of several years can be achieved. However, as of the moment of opening the packaging it holds true for all packaging methods that the contents need to be consumed as soon as possible in connection with deterioration. By placing the contents of an opened packaging (back) in the refrigerator, the shelf life can usually be extended by a few days. However, the deterioration process has already started.

This can largely be attributed to water and other moisture present in the products. By removing water and moisture from the product, the shelf life can be considerably extended. However, from most products it will not be possible to remove all moisture without the product becoming too chewy and losing some of its flavor. A few examples of products from which almost all moisture has been removed, are dried shrimps, dried chicken meat such as "chicken jerky", dried fish, including stockfish, and dried types of red meat, including "beef jerky" and "pork jerky". Beef jerky, pork jerky and chicken jerky consist of small strips of meat that are smoked, dried and seasoned. Even when these products are placed in cooking liquid during the preparation of dishes, only a limited amount of moisture will be absorbed by these products, as a result of which they remain chewy. These final products therefore usually do not have the purpose of being reprocessed by absorbing moisture.

An example of a product that is being reprocessed by absorption of moisture is stockfish. The reprocessing takes a lot of time as stockfish only slowly absorbs water and moisture. To improve absorption of moisture, stockfish must be bashed prior to use in preparing dishes, in order to make it softer and more tender. Stockfish should then soak for at least 36 hours in a cool place. The soaking water should be refreshed at intervals of approximately 9 hours. To effect that the stockfish regains its original white color, it should be soaked for several days. This increasingly deteriorates the flavor. Beef jerky, pork jerky and chicken jerky when used in the preparation of dishes absorb so little moisture that they remain chewy. Even with a laborious, additional process, such as for instance the process used in the reprocessing of stockfish, beef jerky, pork jerky and chicken jerky will remain chewy. That is why they are predominantly used as snacks. Dried shrimps are predominantly used as addition to dishes with liquid and not so much as a snack. Dried shrimps will also show reduced flavor and a less optimal texture. For the final consumer, using dried products according to the state of the art in dishes usually is too laborious and time-consuming. The object of the present invention is among others to in any case partially overcome one or more of the above-mentioned drawbacks.

The present invention provides a method for treating carbohydrate and protein products so that the carbohydrate and protein products:

will have a very long shelf life without refrigeration;

upon reprocessing quickly absorb water and/or other moisture and in terms of flavor and texture are practically the same as the carbohydrate and/or protein products in their original condition;

are turned into airy and crispy carbohydrate and/or protein products, which without reprocessing can among others be used as a snack, sandwich filling, as a cracker or as a mini cracker.

According to a first aspect the invention in particular provides a method for preparing a carbohydrate and/or protein product ("method"), wherein the method comprises the following steps: a) grinding and/or mixing a quantity of carbohydrate and/or protein comprising one or more types of carbohydrates and/or proteins; b) adding oil and/or margarine and an emulsifier to the carbohydrate and/or protein; c) mixing the mixture of carbohydrate and/or protein, emulsifier, oil and/or margarine into a substantially homogeneous paste; d) adding water to the paste obtained in step c) in such a way that the paste, after adding the water, comprises a water-in-oil emulsion; e) heating the paste comprising the water-in-oil emulsion by means of microwaves, in particular in a microwave oven, with the paste being divided into (small) portions.

In particular, step a) comprises the grinding and/or mixing of a quantity of carbohydrate-containing and/or protein-containing material in particular a fresh carbohydrate-containing and/or protein-containing (starting) material. In this text the term "fresh" as in fresh raw material, in particular relates to a raw material that does not have the form of (non-perishable) powder or flower (see further below). In particular, a fresh material has a limited shelf life.

By means of the method a carbohydrate and/or protein product is provided, in particular a puffed carbohydrate and/or protein product.

In that way the invention, according to a further aspect, provides a carbohydrate and/or protein product ("product"), in particular a puffed carbohydrate and/or protein product, in particular obtainable using the method according to the invention. The terms "puffed" and "puffing" are used in this text in relation to products that expand and become airy (strongly decrease in terms of density) during preparation (puffing). These types of processes are known from for instance puffing corn, resulting in popcorn. The products according to the invention may for instance lose half their weight during the preparation. In an embodiment, a mass of the product is obtained from a mass of the paste comprising the water-in-oil emulsion. In embodiments, the mass of the product is 20-40% of the mass of the paste comprising the water-in-oil emulsion. The products may furthermore increase in volume 2 up to 3 times during preparation. The products are airy in particular. In embodiments, the products have a density selected from the range of 50-700 g/l, in particular 50-350 g/l, such as 50-150 g/l.

According to a further aspect, the invention provides a device for the (continuous) preparation of a carbohydrate and/or protein product, wherein the device is configured for sequentially carrying out the following actions (steps): (a) grinding and/or mixing a quantity of carbohydrate and/or protein comprising one or more types of carbohydrates and/or proteins; (b) adding oil and/or margarine and an emulsifier to the carbohydrate and/or protein; (c) mixing the mixture of carbohydrate and/or protein, emulsifier, oil and/or or margarine into a substantially homogeneous paste; (d) adding water to the paste obtained in step (c) in such a way that the paste, after adding the water, comprises a water-in-oil emulsion; (e) heating the paste comprising the water-in-oil emulsion by means of microwaves, with the paste being divided into (small) portions.

BRIEF DESCRIPTION OF THE FIGURES

FIG. 1 shows a schematic example of the preparation of an oil-in-water emulsion (O/W emulsion) wherein oil in the presence of an emulsifier, is added to water.

FIG. 1(a) schematically shows an early stage of the preparation of the O/W emulsion;

FIG. 1(b) schematically shows a situation wherein more oil has been added to the emulsion that is schematically shown in FIG. 1(a). In the (W/O) emulsion water is the continuous phase; and FIG. 1(c) schematically shows a water-in-oil emulsion (W/O emulsion), wherein oil (colored black) is the continuous phase.

DETAILED DESCRIPTION

In this description and in the claims the term protein or protein-containing (starting) material, can refer to any edible, soft tissue of both vertebrates and invertebrates. Non-limitative examples of such soft tissue, in particular muscle tissue, but also tissue that is rich in collagen, such as interstitial tissue, to which the method according to the invention applies and that can further be referred to as meat (protein/carbohydrate), are: beef, pork, horsemeat, mutton, goatmeat, chicken meat and meat from other poultry, fish and soft tissue of crustaceans and shellfish and insects. In particular, the term "meat" is used in this text for all different types of animal tissue. Meat comprises protein in particular. The invention provides that the meat products (in particular protein products) prepared using the method according to the invention, can also comprise tougher tissues of the animals from which the meat originates, whether or not in ground condition. Take for instance the shell of crustaceans or the tougher tissues of insects. The invention also provides that the (prepared) meat (protein) products can comprise ingredients of vegetable (carbohydrate/protein) origin, including for instance spices, vegetables, seeds, tubers, cereals, fruits. A few possible examples are potato, tomato, paprika, carrot, sweet potato, leek, chicory, cucumber, seaweed, pickle, strawberry, berry, apple, etc.

The fresh (starting) material can comprise vegetables and/or meat. The fresh material can also comprise side streams, such as for instance cutting waste from vegetable processing or residual/additional streams from meat processing (or fish processing, etc.). In further embodiments, the starting material can also be a prepared material. In an embodiment, a sausage material, such as a (cooked) frying sausage or hotdog, is used for providing the protein. Such an embodiment can be advantageously combined with embodiments wherein the vegetable (starting) material comprises (boiled) potato and in particular sauerkraut.

In this description and in the claims the term carbohydrate can refer to any edible vegetable product. In particular, the carbohydrates in the final product (or in the semi-finished product as well, see further below) can originate from vegetable material. Non-limitative examples of carbohydrates to which the method according to the invention applies and that can further be referred to as vegetable are: vegetables, tubers, fruits, fruit, cereals. The invention also provides that the vegetable (carbohydrate) products can comprise ingredients of meat (protein) origin, including for instance, poultry, beef, shrimps, types of fish. The term "carbohydrate" is in particular used in relation to starch (in the material). A carbohydrate as used in this text comprises a starch in particular. The vegetable (starting) materials can furthermore comprise protein. In an advantageous embodiment, potato is used as a source of carbohydrate. In particular, the carbohydrate comprises (the vegetable material) potato. In further embodiments, the carbohydrate comprises at least 50 wt %, such as at least 75 wt % of potato. In a further embodiment, the product comprises at least 50 wt % of potato. It has turned out that potato can form a good matrix for the product. Paste comprising potato can result in a desired expansion and airiness of the product. In embodiments, potato is mixed with a further carbohydrate and/or protein and is ground, after which once oil and/or margarine and an emulsifier have been added, it is mixed into a paste. In an embodiment, the potato is boiled (see below). In embodiments, a ratio of a weight of potato to a weight of the further carbohydrate and/or protein, is selected from the range of 1:1-10:1. In an embodiment of the method, the homogeneous paste of step c) consists of at least 50 wt % of potato. In a further embodiment, the water-in-oil emulsion consists of at least 50 wt % of (boiled) potato. In another embodiment, the carbohydrate comprises no potato.

In this text the term "a carbohydrate" can also relate to more than one (different) carbohydrate. Analogous thereto the term "a protein" can also relate to one or more (different) proteins.

In an embodiment the carbohydrate and/or protein can comprise any edible, soft tissue of both vertebrates and invertebrates and/or edible vegetable material. In particular, any edible, soft tissue of both vertebrates and invertebrates and/or (any) edible vegetable material can be used as a source of carbohydrate and/or protein.

The term "paste" in the paste comprising the water-in-oil emulsion in particular relates to a liquid viscous paste having a specific viscosity. In embodiments, the viscosity (of this paste) is selected from the range of $10\text{-}10^6$ mPa·s, in particular $100\text{-}10^5$ mPa·s, such as 1-250 Pa·s, at room temperature. The viscosity of the paste in an embodiment can be compared with that of ketchup or tomato purée.

A mixing system can be used for grinding and/or mixing the quantity of carbohydrate and/or protein comprising one or several types of carbohydrates and/or proteins. For that purpose, the device can comprise a (first) mixing system, in particular comprising a starting material inlet. The starting material inlet is in particular configured for receiving a quantity of carbohydrate and/or protein (starting material). In embodiments, the mixing system comprises a (continuous) mixer. In further embodiments, the mixing system (further) comprises a reduction system and/or a grinding system. The device can furthermore comprise a further mixing system, in particular connected to the (first) mixing system for transporting the ground and/or mixed quantity of carbohydrate and/or protein from the first mixing system in the further mixing system. The further mixing system, in an embodiment, further comprises an oil/fat inlet configured for supplying oil and/or margarine and an emulsifier to the mixture. The further mixing system is in particular configured for providing a homogeneous paste comprising the mixture of carbohydrate and/or protein, emulsifier, oil and/or margarine. In embodiments, the further mixing system is connected to an emulsion mixing system, wherein in particular (a part of) the homogeneous paste can be (continuously) provided to the emulsion mixing system.

The emulsion mixing system is a mixing system and is in particular configured for in a controlled manner adding water (via a water inlet) to the (obtained homogenous) paste, (and mixing this mixture) so that the paste, after adding the water, comprises a paste comprising a water-in-oil emulsion. The emulsion mixing system comprises the water inlet for (controlled) supply of water. The emulsion mixing system can furthermore comprise a sensor for determining an emulsion characteristic of the paste comprising the water-in-oil emulsion. In particular, the device comprises a control system for controlled supply of water to the paste. The emulsion mixing system further comprises an emulsion outlet for (in portions) transporting the paste comprising the water-in-oil emulsion to a heating system configured for heating by microwaves (see further below), and in particular providing the carbohydrate and/or protein product.

In embodiments, the function of the first mixing system and the further mixing system are combined in one apparatus. In particular, the device comprises a (combined) mixing system for grinding and/or mixing a quantity of carbohydrate and/or protein and subsequently after adding oil and/or margarine and an emulsifier, mixing the mixture (of carbohydrate and/or protein, emulsifier, oil and/or margarine) into a substantially homogeneous paste.

In yet a further embodiment, the function of the emulsion mixing system is combined with the function of the further mixing system and optionally with the function of the first mixing system. The device can comprise several mixing systems that are (sequentially) connected to each other, in particularly wherein the first mixing system comprises a starting material inlet (for the supply of carbohydrate and/or protein) and the last mixing system comprises an emulsion outlet (for discharging the paste comprising the water-in-oil emulsion). The device comprises at least one (overall) mixing system comprising the starting material inlet, the oil/fat inlet, the water inlet and the emulsion outlet.

A product prepared (according to the method) from vegetable material can thus comprise a carbohydrate and/or protein product.

In this text, in particular the term "product" such as in protein product, meat product, carbohydrate product, carbohydrate and/or protein product, is used for the product prepared or obtained (according to the method). The terms that do not contain the word product in their names, such as in protein, carbohydrate, protein-containing (starting) material, meat, vegetable material etc., are used in particular in relation to the starting material/raw material for the method. In particular, the term protein product can be used for a product comprising more (grams of) protein than (grams of) carbohydrate. The term carbohydrate product can also be used for a product comprising more (grams of) carbohydrate than protein. A protein product can therefore also comprise carbohydrates and a carbohydrate product can comprise proteins.

In this text the term "oil" is used in particular for a fat that is liquid at the preparation temperature. The oil can originate from animal sources. The oil can originate from vegetable sources. The oil can be a combination of more than one type of oil. In particular, the oil is liquid at room temperature. In further embodiments, the oil is liquid at at least 40° C., such as at least 30° C. Also, oil that is liquid below 0° C. can be used. The oil can also comprise several additives. In the description and the claims, the term "margarine" is also used. In particular, the margarine comprises oil (or fat) and one or more additives. Margarine preferably comprises at least 70 wt % of oil (or fat) and in particular approximately 80% of oil (or more). Margarine can be replaced by oil and/or fat.

The method comprises heating (a portion of) the paste comprising the water-in-oil emulsion by means of microwaves. Heating by means of microwaves is known and comprises in particular the use of (electromagnetic) radiation having a frequency from the range of approximately 433 MHz-24 GHz. In particular, the frequency of the radiation is approximately 2450 MHz. The frequency may also differ from this, but is particularly defined by international standards. In an embodiment, the radiation comprises a frequency of approximately 915 MHz. In another embodiment, the radiation comprises a frequency of 433 MHz. Heating by means of microwaves can also take place in a microwave oven (see further below). In an embodiment, the device for that purpose comprises a microwave oven. In particular, the microwave oven comprises a continuous microwave oven, in particular comprising a conveyor belt for transporting a portion of the paste comprising the water-in-oil emulsion from a first location where the paste comprising the water-in-oil emulsion is arranged on the conveyor belt, to a second location where the heated paste comprising the water-in-oil emulsion can leave the conveyor belt. The device is in particular configured for, in portions, providing the paste comprising the water-in-oil emulsion from the emulsion outlet, in the microwave oven, in particular on the first location of the conveyor belt. For that purpose, the emulsion outlet can comprise a pipe providing the paste directly in the microwave oven, in particular on the first location of the conveyor belt. Optionally, the device comprises a portioning device arranged between the emulsion outlet and the microwave oven, in particularly the first location of the conveyor belt, for in a controlled manner arranging the paste comprising the water-in-oil emulsion in portions in the microwave oven (on the conveyor belt).

In this text the term "portion" can regard one or several (small) portions.

In an embodiment the method further comprises finishing baking the carbohydrate and/or protein product (obtained in step e) in a conventional oven. The method can therefore further comprise finishing baking the paste comprising the water-in-oil emulsion in a conventional oven, which paste was heated in portions. The device can further comprise an oven, in particular a conventional oven. In particular, the (conventional) oven is configured for receiving the paste comprising water-in-oil emulsion, which paste was heated in portions, and finish baking them and in a continuous manner providing the carbohydrate and/or protein product.

In an embodiment, the method according to the invention comprises the following steps:
a) making a fine homogeneous mixture comprising chicken or other poultry, and/or shrimps and/or other crustaceans and/or shellfish and/or fish, and/or red meat, and/or vegetables harvested from the land, and/or sea vegetables, and/or tubers, and/or fruits and/or nuts, comprising a paste, below also referred to as a homogeneous semi-finished mixture or homogeneous semi-finished paste, having a specific compound HLB (hydrophilic-lipophilic balance) value of water and fat and/or oil. The HLB value is a dimensionless figure indicating to what extent a surfactant is either hydrophilic or lipophilic (see further below).
b) discharging the homogeneous semi-finished paste in parts ("parts of semi-finished product") having main dimensions of between 1 mm and 40 mm, having a specific compound HLB value.
c) subjecting the parts, comprising the homogeneous semi-finished paste (parts of semi-finished product) to a microwave oven treatment to form an airy and crispy product;
d) subsequently finish baking in a (hot air) oven, in particular at a temperature of at the most between 160-170° C. to prevent the formation of acrylamide, to make starch better digestible and remove the last moisture residues.

The above-mentioned embodiment of the method according to the invention and particularly step d) in embodiments results in a carbohydrate or protein product that differs from the carbohydrate and protein products according to the state of the art in that they have a very low residual moisture content as a result of which the internal moisture migration is negligible. The residual moisture content in a carbohydrate or protein product prepared according to this method can in embodiments be 0.1 wt %. In further embodiments the residual moisture content of the (final) product is 10 wt % at a maximum, such as 9 wt % at a maximum, in particular 8 wt % at a maximum, such as 5 wt % at a maximum, or even 1 wt % at a maximum.

By using the method according to the invention, an airy and crispy final product is obtained with a negligible moisture content in the range of 0.1-10 wt %, such as in the range of 1-9 wt %, in particular 2-8 wt %. In this text the term "wt %" is defined as the weight of a first fraction (such as moisture) of a product divided by the (total) weight of the product. This airy and crispy product is highly suitable to be used as for instance sandwich filling, a snack or as an ingredient for hot and cold dishes and among other things differs from products according to the state of the art in a prolonged shelf life. Products prepared using the method according to the invention have a long shelf life, even when not refrigerated, without flavor, color and texture changing.

In the section "Experiments" the method is further elucidated in a non-limitative manner on the basis of a few examples of experiments carried out. The experiments were done with different weight ratios of chicken, shrimp, salmon, tuna, vegetables, fruits, sea vegetables, types of tubers, nuts, fruit, dairy products, water, oil, liquid margarine, solid margarine, butter, different types of oil, fat and emulsifiers. Examples of dairy products are yoghurt, cream cheese, creme fraiche, sour cream, cheese.

These experiments showed that it is important that the raw meat products, fish products, chicken products, crustaceans, vegetables, fruits are ground into a fine paste prior to any water, fat, emulsifier or other ingredients being added. Not until after that are fat (oil), water and emulsifier, optionally with spices and other flavorings, added to the ground paste (see further below for the order of adding). Experiments have also been carried out by mixing the meat types, vegetable types, fruit types, tuber types, fish types and shrimp types with one another.

Also in those cases, first a fine paste was made and not until after that, extra additives such as water, fat, oil, emulsifier and flavorings, including for instance spices, were added. When grinding to obtain the fine paste, it should be effected that during grinding as little heat as possible is developed in the grinding machines used.

In particular, in the preparation the last ingredient to be added, in particular in steps, is water. At first the oil and an emulsifier can be added to the paste. Adding water in a controlled manner may ensure that the semi-finished product (the paste) comprises a W/O emulsion and that it does not revert into an O/W emulsion. The fact that the semi-finished products comprise a W/O emulsion is among other things noticeable because the semi-finished products cling to a surface the emulsion (paste) contacts, to a much lesser degree than an O/W emulsion does. In particular, an O/W emulsion in which the water phase comprises a carbohydrate (starch) will cling strongly to surfaces it contacts (see further below).

Although W/O emulsions adhere to a surface less, it was shown in experiments that it is advantageous to select the surface on which the semi-finished products are heated such that the adhesion between the surface and the emulsion and the final product is minimal. Preferably, the surface on which the paste is heated comprises non-adhesion or non-stick properties. In an embodiment, a basis on which the portions of paste comprising the water-in-oil are placed during heating by means of microwaves (in the microwave oven), for instance a conveyor belt in the device according to the invention, comprises non-stick properties.

The (protein-containing) paste should preferably remain raw, and should not achieve a certain degree of readiness to eat due to heat development in whatever way. If the paste is mixed with cooked vegetables, tubers and/or fruits, they should preferably first be chilled. This also applies when adding water, oil, fat and flavorings when mixing them with the paste. These additives preferably should not lead to the meat being cooked in part or in whole. In embodiments in which a carbohydrate (vegetable material) and a protein (meat) are mixed into the semi-finished product, the protein (meat) can be cooked. In particular if a maximum of 75 wt %, such as a maximum of 50 wt %, in particular a maximum of 40 wt % of the protein and the carbohydrate (starting material) originates from meat (or animal starting material), the meat can be cooked. In an embodiment 25-40 wt % of cooked meat (pork, beef, chicken, shellfish, crustaceans, fish, etc.) are mixed with 60-75 wt % of potato (during step a) of the method).

If over 95 wt % of the protein originates from animal material, the animal material is preferably processed into the paste as a non-cooked material.

The results of the experiments carried out with different ratios of water, oil, fat, liquid margarine and lecithin as an emulsifier for obtaining a puffed, meaning an airy and crispy, final product, can in random order (also see "Experiments") be summarized as follows:

Types of meat, fish and crustaceans that are naturally rich in fat, first need to be made low-fat as much as possible, so that the material contains a maximum of 10 wt % of fat, preferably a maximum of 5 wt % of fat. In an embodiment, the carbohydrate and/or protein (in particular the animal (starting) material and/or the vegetable (starting) material) is therefore made low-fat;

If no emulsifier is added to semi-finished products, there will be no increase in volume. (See among others example 4 and example 5 in "Experiments");

The use of a W/O emulsion seems essential in obtaining an airy and crispy final product;

If the carbohydrate and/or protein part in the paste is doubled when the quantity of fat/oil and water remains the same, there is no increase in volume. (See Experiments, example 6 and example 10);

An ideal mixing ratio of the paste, emulsifier, water, margarines and/or oils and/or fats seems to depend on the starting material;

If too large a quantity of margarines and/or oils and/or fats with lecithin are used, only the baking process takes place. The final product is then baked and has shrunk instead of being airy and crispy;

If margarines and/or oils without lecithin are used, only the baking process takes place. The final product is then baked and has shrunk instead of being airy and crispy;

If too much water is added, only a steaming process or boiling process takes place and the final product will be soft and kneadable instead of airy and crispy;

If too little or no water is added, the steaming effect takes place in too limited a degree and the final product will be tough instead of airy and crispy; More water than naturally present in the carbohydrate and/or protein will be required. Water that is originally present does not seem to be sufficient for making a paste (semi-finished product) that will result in the envisaged final product;

In a preferred embodiment, first the steaming process takes place, immediately followed by the baking process.

In experiments it was also shown that the protein and/or carbohydrate products absorb water very easily. Embodiments of the products can directly be used in soups or sauces. When absorbing moisture (by the products) a full flavor and firm texture can be obtained once more. Thus, reprocessing of the final products obtained according to the present method, in order for them to absorb water and/or moisture is simple.

It further seems advantageous to pre-treat vegetable and animal starting materials in different ways. Animal (starting) materials have no cell wall. Vegetable materials comprise a cell wall. During mixing vegetables such as potato, carrot, tomato, etc., and fruit using a hand blender or a blender the cell walls are broken open. Breaking cell walls open can also take place by boiling. For the method meat and fish need not be boiled beforehand as meat and fish products do not have cell walls. An energy transfer of a few minutes (2-4 minutes) with microwaves at a power of 900 watts (per approximately 20-25 grams of semi-finished product—or portion) usually seems sufficient to achieve the puff effect. Plant types that are not boiled beforehand, will under similar conditions require much more time, as breaking away the cell walls requires extra energy.

Vegetable materials preferably are cooked beforehand. In an embodiment (comprising edible vegetable material) the vegetable material has been boiled. Experiments wherein breaking away the cell walls in raw vegetables and other plant types was effected by using a mixer/high speed blender, and without first boiling them to a ready-to-eat state, processing them into a homogeneous semi-finished paste, have not yet resulted in the desired puffed final product. Animal (starting) materials preferably are not cooked beforehand. When using vegetable (starting) materials in combination with animal (starting) materials, both the vegetable and the animal material may have been cooked, in particular if the mass of the vegetable (starting) material equals or exceeds the mass of the animal (starting) material that is being used.

The use of the term "step" in this text, like in the description of the method of the invention, does not mean that in embodiments one or more other steps could not be part of the method as well. However, in embodiments of the method of the invention the steps are carried out in the order as described herein, without further intermediate steps unless they are indicated. Steps prior to the method and/or subsequent to the method are not precluded in embodiments.

In order to further elucidate the importance of the water-in-oil (W/O) emulsion for being able to effect a positive result in the processing of the carbohydrate and/or protein products using the method according to the invention, succinct general information about W/O and O/W (oil-in-water) emulsions is given below.

An emulsion is a mixture consisting of immiscible liquids, that means liquids that cannot be mixed together into a homogeneous solution. Obtaining an emulsion of immiscible liquids requires an emulsifier.

FIG. 1 shows a schematic example of the preparation of an O/W emulsion wherein oil, in the presence of an emulsifier, is added to water. FIG. 1(a) schematically shows an early stage in the preparation of the O/W emulsion, wherein a relatively small quantity of oil in the form of drops 1, separated from each other, has been mixed with water 2. In this case, water is in the so-called continuous phase. FIG. 1(b) schematically shows a situation wherein more oil has been added to the emulsion that is schematically shown in FIG. 1(a). Oil should be added gradually, in order to prevent the emulsion from reverting from an O/W emulsion into a W/O emulsion, the latter being schematically shown in FIG. 1(c). Whereas in FIGS. 1(a) and 1(b) water constituted the continuous phase, in the situation shown in FIG. 1(c) oil (colored black) has become the continuous phase.

A known example of making an O/W emulsion is the preparation of mayonnaise, wherein for instance egg yolk is used as an emulsifier. Mayonnaise consists of approximately 70% of oil and approximately 30% of water. Nevertheless, this is an oil-in-water emulsion. The oil, dispersed as small drops, is present in the water. The water therefore, also in this case, is in the continuous phase.

An example of a W/O emulsion is margarine. The continuous phase is oil in which the water is dispersed as fine droplets. In the method for preparing products from carbohydrate and/or protein, including chicken meat, crustaceans, red meat, fish, or vegetables, types of tubers, leguminous plants, fruit and cereals, a W/O emulsion is made.

It is important that the W/O emulsion does not revert into an O/W emulsion. An important characteristic of the required W/O emulsion is the fact that the concentration of water is higher than the concentration of oil and/or fat. Depending on the concentrations that are present in the meat by nature, approximately 20-40 ml of water and 5-20 ml of oil is added per 100 grams of meat paste, for puffing.

In an embodiment, the paste comprising the water-in-oil emulsion comprises 10-60 ml, in particular 20-40 ml of water and 1-30 ml, such as 2-20 ml, in particular 5-20 ml of (added) oil or fat to each 100 grams of carbohydrate and/or protein.

Meat and fish products that are rich in fat, will first need to be made low-fat as much as possible.

First oil and/or margarine with an emulsifier is added to the paste, after which it is made into an at least substantially homogeneous mixture. Then the water is added (in steps) in small portions (quantities) and mixed with the paste mixture. In a W/O emulsion thus obtained, the water is dispersed in the oil as fine droplets. The continuous phase is oil.

The fact that in the experiments some semi-finished products did, and others did not puff, meaning not showing an increase in volume, will be explained below. A microwave, like in a microwave oven, induces only polar molecules to vibrate. Most molecules are electrically neutral. Electrically neutral molecules are not polar. That means that they are either positively or negatively charged. Examples of polar molecules are water molecules, sugar molecules and protein molecules. Water molecules are dipolar. Oils are substantially apolar. The frequency of a microwave oven usually is 2450 MHz. The penetration depth of a microwave oven, depending on the medium and the frequency used, in principle is limited to a few centimeters only. The semi-finished products (or parts of semi-finished products) that are heated, preferably have limited dimensions. Preferably a smallest characteristic length (such as a minimum of height, width, or length) is selected in the range of 0.5-10 mm, such as 0.5-8 mm. A largest characteristic length (such as a maximum of height, width, and length) in embodiments is 10 cm at a maximum, such as 6 cm at a maximum, in particular 4 cm at a maximum. In yet another embodiment the semi-finished product (the part in question of semi-finished product) is provided as a flat disk having a diameter of more than 10 cm, such as more than 20 cm, such as approximately 30 cm. In an embodiment, each portion of the paste comprising the water-in-oil emulsion that is heated by means of microwaves (in the microwave oven) has a size of at least 0.5 mm, such as at least 1 mm, and at the most 300 mm, in particular of at least 1 mm and at the most 40 mm. The term "characteristic length", "main dimension" and "size" can be used as synonyms in this text.

The volume of the portion (of the paste comprising the water-in-oil emulsion to be heated) in an embodiment can comprise around 1 mm$^3$. In a further embodiment the volume equals or exceeds 100 mm$^3$, such as in the range of 100 mm$^3$-1000 mm$^3$. In an embodiment this volume may comprise 100 cm$^3$. In a further embodiment this volume is 50 cm$^3$ at a maximum, such as 25 cm$^3$ at a maximum, in particular 1 cm$^3$ at a maximum, such as 100 mm$^3$ or 10 mm$^3$ at a maximum. In particular each portion has a volume selected from the range of 1 mm$^3$-50 cm$^3$, in in particular 1 cm$^3$-30 cm$^3$. In an embodiment each portion has a mass selected from the range of 0.1-500 grams, such as 1-300 grams, more in particular 10-300 grams, such as 100-300 grams. In further embodiments, a (small) portion has a mass selected from the range of 0.1-300 grams, such as 0.5-300 grams, more in particular 0.5-100 grams, such as 1-25 grams. In an embodiment, each portion of the paste comprising the water-in-oil emulsion that is heated by means of microwaves, has dimensions of at least 1 mm and at the most 300 mm, wherein each portion has a mass selected from the range of 1-300 grams.

In a further embodiment, each portion of the paste comprising the water-in-oil emulsion that is heated by means of microwaves, has dimensions of at least 1 mm and at the most 40 mm, wherein each portion has a volume selected from the range of 1 mm$^3$-50 cm$^3$, and wherein heating the portions of the paste comprising the water-in-oil emulsion takes place in a microwave oven.

Water molecules reach the boiling point sooner than oil molecules do. As the water molecules are confined in fine droplets in the continuous phase consisting of oil, a relative pressure build-up is created. Oil has a higher boiling point than water does, and oil molecules are relatively apolar. The energy of the microwave oven will first heat the polar water molecules that are surrounded by the substantially apolar oil molecules, which moreover have a higher boiling point than the polar water molecules. Under atmospheric conditions, water has, as is known, a boiling point of 100° C. Oil, depending on the type, has a boiling point of 140-180° C. When heated in a microwave oven the water reaches its boiling point first, as a result of which it is turned into steam. During cooking the semi-finished product, steam and oil escape from the semi-finished product. Meanwhile the oil also reaches its boiling point and the mixture starts to bake. A hard exterior is created due to baking. The semi-finished product will be internally pressurized due to the formation of steam in the finely dispersed water drops, as a result of which these water drops transform into bubbles of steam. The semi-finished product consequently swells, wherein the steam bubbles at some point cause the product to burst open. The product will then move. The product is then puffed. During this process the dimensions of the semi-finished products first increase by a linear augmentation factor of approximately 2 to 3, after which the final product on average has dimensions that are a factor 2 larger than the original semi-finished product.

The use of microwaves in the preparation of food is not very common and seems less suitable for this purpose as well. A microwave oven is mainly used for heating food (that has already been cooked). For the present method the final use of microwaves is very important. Experiments comparable with the examples described in the section "Experiments" have also been carried out with other heating apparatuses such as a convection oven, grill and conventional oven. The envisaged result was not achieved with them. In most types of heating apparatuses, the food is heated from the outside. The present method indeed advantageously utilizes heating the food from the inside by inducing the food to vibrate from the inside.

For puffing meat that is rich in fat, such as pork, fatty fish such as salmon and fatty crustaceans, they will first have to be made low-fat as much as possible.

For achieving the puffed effect when processing the final products using the method according to the invention, it is important that the mixing ratio of water and oil of the semi-finished product are properly adjusted to each other. The hydrophilic and lipophilic balance, the HLB value, is critical in that. It is of the essence that the steaming process takes place first, immediately followed by the baking process. The steaming process namely ensures the creation of numerous air pockets once the steam bubbles have exploded. In the experiments carried out in which the baking process started first, too few air pockets were formed for effecting a noticeable increase in volume. Rather the opposite was the case even. The semi-finished products started to bake and shrunk. First of all, steam must be created in the semi-finished product which will ensure cooking and the creation of air pockets. Subsequently the discharge of oil ensures that the semi-finished product starts to bake, as a result of which a hard crust is created ensuring the inclusion of steam. Due to further pressure build-up in the semi-finished product, the semi-finished product starts swelling. During swelling numerous air pockets are created. During that stage, the volume of the semi-finished product is increased by an average factor of approximately 3. After a few seconds the swelling decreases, as the baked, hard exterior bursts open and the semi-finished product puffs. Due to puffing the overpressure and residual moisture disappear. The oil that is still present ensures that the product at the location of the formed air pockets starts to bake. The volume then decreases down to an average of almost a factor 2 relative to the initial condition. The result is an airy and crispy final product having a negligible moisture content and little residual oil. The moisture content of the final product can be controlled and minimized with the method according to the invention.

Emulsifiers are surfactants, usually with a lipophilic and a hydrophilic part, that are able to nest around interfacing layers between the aqueous and fatty parts. Fat and water repel each other, as a result of which an emulsion without emulsifier easily falls apart. An emulsifier prevents this repulsion. To what extent either the hydrophilic or lipophilic nature dominates, is indicated by the HLB value of the surfactant (HLB=Hydrophilic-Lipophilic Balance). A high HLB value, in the range of 10 to 18, indicates a substantially hydrophilic emulsifier, suitable for emulsifying fats or oils in water. Emulsifiers with a low HLB value, in the range of 3-8, are lipophilic and suitable for water-in-oil emulsions.

In an embodiment, the emulsifier has a HLB value of at the most 10. In a further embodiment, the emulsifier has a HLB value of at the most 8. In particular the HLB value of the emulsifier is selected in the range of 3-8. The HLB value of the emulsifier can be selected by selection of the emulsifier.

The method according to the invention comprises the possibility of using any emulsifier suitable for the purpose, including but not limited to for instance lecithin and milk proteins.

By using the method according to the invention, in particular a carbohydrate and/or protein product is obtained. In embodiments, the carbohydrate and/or protein product is puffed during the preparation. In a further embodiment, baking the carbohydrate- and/or protein product is finished in particular in a (conventional) oven.

In particular the carbohydrate- and/or protein product is airy and crispy. In embodiments, the product has a density selected from the range of 50-350 g/l, such as 50-150 g/l. The product preferably comprises a low moisture content, such as a maximum of 10 wt % of moisture. In particular, the product comprises a moisture content of less than or equal to 9 wt %, as selected from the range of 0.05-9 wt %. In embodiments, the product comprises 1-5 wt % of moisture. In other embodiments 5-10 wt % of moisture. In yet other embodiments, the product comprises a maximum of 2.5 wt %, such as a maximum of 1 wt %, or even a maximum of 0.1 wt % of moisture. In an embodiment the moisture content of the product is at the most 0.1 wt %. In a further embodiment the moisture content of the product is at the most 10 wt %. In particular the moisture content of the product is selected from the range of 1-9 wt %.

During the method the product loses mass (weight), in particular due to loss of moisture. The loss of mass in embodiments is 50-80 wt % (relative to the paste comprising the water-in-oil emulsion to be heated). The table below shows the weight (the mass) of the (final) product of some embodiments, starting from 1 kg of semi-finished product (the paste comprising the water-in-oil emulsion). The final product is provided here by one or several parts of semi-finished product.

TABLE weight of the product (one or several portions) starting from different types of starting materials; starting from 1 kg of semi-finished product.

| (Type of) starting material | weight of the product (gram) |
|---|---|
| Side streams (i.a. vegetables, tubers and fruit) | ±360-380 |
| Fresh vegetables with skin and seeds (tomato, paprika and the like) including potato (regular potato, sweet potato) with skin | ±300-320 |
| Fresh vegetables sieved with peeled potato | ±220-270 |
| Scampi and shrimps with shell, fish with skin and scales | ±290-315 |
| Scampi and shrimps without shell, fish without skin and without scales | ±220-240 |
| Chicken 100% | ±225 |
| Chicken with potato at a (weight) ratio of chicken:potato = 6:4 | ±220 |

In particular, the carbohydrate- and/or protein product comprises a crispy shelf life of at least two years. Crispy shelf life in this text relates to the shelf life of the crispiness, the crispiness barely changing over a long period of time (such as two years). Crispiness is known concept and can for instance be determined using a sensory panel or be measured using a texture analyzer. In further embodiments, the carbohydrate- and/or protein product comprises a crispy shelf life of at least one year.

The carbohydrate- and/or protein product comprises in particular one or more of the components selected from the group of meat, fish, dairy, vegetables, nuts and fruit. In particular, such a component is processed, in particular during carrying out the method, for instance in the device according to the invention.

The exemplary embodiments of the method according to the present invention as discussed in this description, are only a few of the many possible embodiments within the framework of the invention and therefore should be considered as non-limitative.

The internal migration of moisture (in the product) is strongly reduced by the method. Migration of moisture causes the moisture to migrate from the softer crumb to the crisp crust. This results in the crust becoming limp and thus losing its crispiness. Due to the steps a) through d) of the said embodiment of the method according to the invention, the internal moisture migration is reduced to such an extent that retaining a very long crispy shelf life is effected. The carbohydrate- and protein products obtained using the method according to the invention are characterized by a shelf life of at least two years. In this context, shelf life should be interpreted as retaining the quality, including the degree of crispiness, after having been packaged in a usual way. The comparable products according to the state of the art such as crisps, savory snacks and crackers have a shelf life of approximately one year. The moisture content of said regular products is approximately 1%. Due to the preparation method according to the state of the art wherein only an oven is used, a moisture content lower than approximately 1% cannot be achieved without the product getting burned. After all, due to a prolonged baking time of those products in order to remove even more moisture, the products will get burned, thus creating products that are unsuitable for consumption. Due to embodiments of the method according to the invention, comprising the use of a microwave oven to cook the products and reduce the moisture content followed by the use of an oven to extract even more moisture, the moisture content in comparison with the current products according to the state of the art such as crisps, savory snacks and crackers can be reduced by a factor 10 without the products getting burned.

In this text the terms "mainly" and "substantially" will be understood by the expert in the field. The terms "mainly" and "substantially" may also comprise embodiments with "entirely", "fully", "all", etc. That is why in embodiments the terms "mainly" and "substantially" can also be left out. Insofar as applicable, the terms "mainly" and "substantially" may also relate to 90% or higher, such as 95% or higher, particularly 99% or more, even more in particular 99.5% or more, including 100%. The term "comprises" also comprises embodiments in which the term "comprises" means "contains" or "consists of".

Moreover, in the description and in the claims the terms first, second, third and the like are used for the difference between possibly similar elements and not necessarily for describing a sequential or chronological order. It will be understood that the terms used in that way are interchangeable under appropriate circumstances and that the embodiments of the invention described herein could function in different orders than described or illustrated in this text.

The apparatuses in this document have among other things been described while being used. As will be clear to the expert in the field, the invention will not be limited to methods or devices while functioning/being used.

It must be noted that the embodiments described herein illustrate, rather than limit the invention and that experts in the field can design (many) alternative embodiments without going beyond the scope of the attached claims. In the claims, references within brackets should not be interpreted as limitations of the claims.

The use of the verb "comprise" and its conjugations does not preclude the presence of elements or steps other than those stated in a claim. The article "a" preceding an element does not preclude the presence of a plurality of such elements.

The invention can be implemented by means of hardware comprising several individual elements, and by means of a suitably programmed computer.

The mere fact that specific measures are described in sub-claims that are different from one another, does not indicate that a combination of these measures cannot be advantageously applied.

The invention further regards a device or apparatus comprising one or more of the characterizing measures described in the description and/or shown in the attached drawings. The invention further relates to a method or process comprising one or more of the characterizing properties described in the description and/or shown in the attached drawings.

It will be clear that the different aspects mentioned in this patent application can be combined and may each individually be eligible for a divisional patent application.

EXPERIMENTS

Below, a number of non-limitative examples of experiments that have been carried out are listed. In those experiments the semi-finished product comprised a water-in-oil (W/O) emulsion, unless explicitly stated otherwise.

Preparation of Protein Products

The pastes of meat (or fish) from examples 1-17 only consist of the meat materials (the animal protein), without addition of other materials, wherein the meat materials have been processed into a paste by grinding/reduction.

In all examples described, the ingredients have been processed via a standard protocol, wherein the ingredients have been added sequentially in a blender. First of all, the paste was put in (the measuring jug of) the blender, to which, while continuously mixing, the liquid margarine and the optional emulsifier were added and mixed into a homogeneous paste. Subsequently the water was added to the mixture in the blender in steps, see further below.

Example 1

The following ingredients were put in a measuring jug of a blender, using lecithin as an emulsifier:
- 100 grams of paste of raw chicken meat;
- 5 ml of liquid margarine;
- 30 ml of water.

These ingredients were then mixed into a smooth and substantially homogeneous mixture. The mixture was put in a pastry bag. This bag was used to pipe dome-shaped semi-finished products having a diameter of approximately 1 cm on an approximately 30-cm diameter Teflon surface. These semi-finished products were subsequently put in a household microwave oven with a power ('rated output') of 900 watts and an approximately 30-cm diameter turntable. After a period of substantially 3 minutes at full power, the dome-shaped semi-finished products underwent a transformation wherein they became airy and crispy, whereas the volume also increased. On average, a linear augmentation factor of substantially 2 was observed.

Example 2

The following ingredients were put in a measuring jug of a hand blender, adding lecithin as an emulsifier:
- 100 grams of paste of raw chicken meat;
- 7.5 ml of liquid margarine;
- 20 ml of water.

These ingredients were then mixed into a smooth and substantially homogeneous mixture. Crisp-shaped semi-finished products having a thickness of approximately 1 mm at a diameter of approximately 25 mm were formed on an approximately 30-cm diameter silicon surface. These semi-finished products were subsequently put in a household microwave oven with a power ('rated output') of 900 watts and an approximately 30-cm diameter turntable. After a period of substantially 2 minutes at full power, the crisp-shaped semi-finished products underwent a transformation wherein they became airy and crispy, whereas the thickness and the diameter also increased. On average, the thickness increased by substantially a factor 1½ and the diameter by substantially a factor 1½.

Example 3

The following ingredients were put in a measuring jug of a hand blender, without adding an emulsifier, according to the standard protocol:
- 100 grams of paste of raw chicken meat;
- 7.5 ml of sunflower oil;
- 20 ml of water.

These ingredients were then mixed into a smooth and substantially homogeneous mixture. Crisp-shaped semi-finished products having a thickness of approximately 2 mm and a diameter of approximately 25 mm were formed on an approximately 30-cm diameter silicon surface. These semi-finished products were subsequently put in a household microwave oven with a power ('rated output') of 900 watts and an approximately 30-cm diameter turntable. After a period of substantially 3 minutes at full power, the crisp-shaped semi-finished products did not undergo a transformation. They did not become airy and crispy, whereas the thickness and diameter did not increase either. On the contrary, the crisp-shaped semi-finished products had shrunk.

Example 4

The following ingredients were put in a measuring jug of a hand blender, adding lecithin as an emulsifier:
- 100 grams of paste of raw chicken meat;
- 7.5 ml of liquid margarine;
- 50 ml of water.

These ingredients were then mixed into a smooth and substantially homogeneous mixture. Crisp-shaped semi-finished products having a thickness of approximately 1 mm at a diameter of approximately 25 mm were formed on an approximately 30-cm diameter silicon surface. These semi-finished products were subsequently put in a household microwave oven with a power ('rated output') of 900 watts and an approximately 30-cm diameter turntable. After a period of substantially 3 minutes at full power, the crisp-shaped semi-finished products did not undergo a transformation. They did not become airy and crispy, whereas the thickness and diameter did not increase either. On the contrary, the crisp-shaped semi-finished products had shrunk.

Example 5

The following ingredients were put in a measuring jug of a hand blender, adding lecithin as an emulsion binder:
- 100 grams of paste of raw chicken meat;
- 40 ml of liquid margarine;
- 20 ml of water.

These ingredients were then mixed into a smooth and substantially homogeneous mixture. Crisp-shaped semi-finished products having a thickness of approximately 1 mm at a diameter of approximately 25 mm were formed on an approximately 30-cm diameter silicon surface. These semi-finished products were subsequently put in a household microwave oven with a power ('rated output') of 900 watts and an approximately 30-cm diameter turntable. After a period of substantially 3 minutes at full power, the crisp-shaped semi-finished products did not undergo a transformation. They did not become airy and crispy, whereas the thickness and diameter did not increase either. On the contrary, the crisp-shaped semi-finished products had shrunk.

Example 6

The following ingredients were put in a measuring jug of a hand blender, adding lecithin as an emulsifier
- 300 grams of paste of raw chicken meat
- 7.5 ml of margarine;
- 20 ml of water.

These ingredients were then mixed into a smooth and substantially homogeneous mixture. Crisp-shaped semi-finished products having a thickness of approximately 1 mm at a diameter of approximately 25 mm were formed on an approximately 30-cm diameter silicon surface. These semi-finished products were subsequently put in a household microwave oven with a power ('rated output') of 900 watts and an approximately 30-cm diameter turntable. After a period of substantially 2 minutes, the crisp-shaped semi-finished products did not undergo a transformation. They did not become airy and crispy, whereas the thickness and diameter did not increase either. On the contrary, the crisp-shaped semi-finished products had shrunk.

Examples 1, 2, 3 without Adding Water or Fat

The experiments according to examples 1, 2 and 3 were carried out once more, the only difference with respect to the examples 1, 2 and 3 being that no water was added to the mixture. No airy and crispy product was created nor did an increase of volume arise. The semi-finished products became chewy and tough.

The experiments according to examples 1, 2 and 3 were also carried out once more, the only difference with respect to the examples 1, 2 and 3 being that no fat was added to the mixture. No airy and crispy product was created nor did an increase of volume arise. The semi-finished products became spongy and were moist.

Examples 4, 5 and 6 with Adaptations of the Shape of the Semi-Finished Products

The experiments according to examples 4, 5 and 6 were carried out once more, the only difference with respect to the examples 4, 5 and 6 being that dome-shaped semi-finished products having a diameter of 4 mm were formed. No airy and crispy product was created nor did an increase of volume arise. The final products had shrunk.

Example 7

The following ingredients were put in a measuring jug of a blender, adding lecithin as an emulsifier:
- 100 grams of paste of raw scampi;
- 5 ml of liquid margarine;
- 10 ml of water.

These ingredients were then mixed into a smooth and substantially homogeneous mixture. The mixture was put in a pastry bag with an approximately 4-mm diameter nozzle. This bag was used to pipe shrimp-shaped semi-finished products having a length of approximately 20 mm at a thickness of approximately 10 mm on an approximately 30-cm diameter Teflon surface. These semi-finished products were subsequently put in a household microwave oven with a power ('rated output') of 900 watts and an approximately 30-cm diameter turntable. After a period of substantially 3 minutes at full power, the shrimp-shaped semi-finished products underwent a transformation. They became airy and crispy, whereas the volume increased. On average, a linear augmentation factor of substantially 2 was observed.

Example 8

The following ingredients were put in a measuring jug of a blender, adding lecithin as an emulsion binder:
- 100 grams of paste of raw scampi;
- 5 ml of liquid margarine;
- 10 ml of water.

These ingredients were then mixed into a smooth and substantially homogeneous mixture. The mixture was put in a pastry bag with an approximately 3-mm diameter nozzle. This bag was used to pipe shrimp-shaped semi-finished products having a length of approximately 25 mm on an approximately 30-cm diameter Teflon surface. These semi-finished products were subsequently put in a household microwave oven with a power ('rated output') of 900 watts and an approximately 30-cm diameter turntable. After a period of substantially 2 minutes at full power, the shrimp-shaped semi-finished products underwent a transformation. They became airy and crispy, whereas the volume increased. On average, a linear augmentation factor of substantially 1½ was observed.

Example 9

The following ingredients were put in a measuring jug of a hand blender, adding lecithin as an emulsifier:
- 100 grams of paste of raw pink shrimps;
- 10 ml of liquid margarine;
- 25 ml of water.

These ingredients were then mixed into a smooth and substantially homogeneous mixture. Crisp-shaped semi-finished products having a thickness of approximately 1 mm at a diameter of approximately 30 mm were formed on an approximately 30-cm diameter silicon surface. These semi-finished products were subsequently put in a household microwave oven with a power ('rated output') of 900 watts and an approximately 30-cm diameter turntable. After a period of substantially 2 minutes at full power, the crisp-shaped semi-finished products underwent a transformation. They became airy and crispy, whereas the thickness and the diameter increased. On average, the thickness of the final products increased by substantially a factor 2 and the diameter by substantially a factor 1½.

Example 10

The following ingredients were put in a measuring jug of a hand blender, adding lecithin as an emulsifier:
- 200 grams of paste of raw pink shrimps;
- 10 ml of liquid margarine;
- 25 ml of water.

These ingredients were then mixed into a smooth and substantially homogeneous mixture. Crisp-shaped semi-finished products having a thickness of 1 mm at a diameter of 30 mm were formed on a 30-cm diameter silicon surface. These semi-finished products were subsequently put in a microwave oven with a power ('rated output') of 900 watts and an approximately 30-cm diameter turntable. After a period of substantially 4 minutes at full power, the crisp-shaped semi-finished products did not undergo a transformation. They did not become airy and crispy, whereas the thickness and diameter did not increase either. On the contrary, the crisp-shaped semi-finished products had shrunk.

Example 11

The following ingredients were put in a measuring jug of a blender, without adding lecithin:
- 100 grams of pasta of raw scampi without shell;
- 5 ml of olive oil;
- 10 ml of water.

These ingredients were then mixed into a smooth and substantially homogeneous mixture. The mixture was put in a pastry bag with an approximately 4-mm diameter nozzle. This bag was used to pipe small domes having a diameter of approximately 10 mm on an approximately 30-cm diameter Teflon surface. These small domes were subsequently put in a household microwave oven with a power ('rated output') of 900 watts and an approximately 30-cm diameter turntable. After a period of substantially 2 minutes at full power, the small domes did not undergo a transformation. They did not become airy and crispy, whereas the volume did not increase either. On the contrary, the product started to bake and had shrunk.

Example 12

The following ingredients were put in a measuring jug of a hand blender, adding lecithin as an emulsifier:
- 100 grams of paste of raw pink salmon;
- 5 ml of liquid margarine;
- 15 ml of water.

These ingredients were then mixed into a smooth and substantially homogeneous mixture. Crisp shapes having a thickness of approximately 1 mm at a diameter of approximately 20 mm were formed on an approximately 30-cm diameter silicon surface. These crisp shapes were subsequently put in a household microwave oven with a power ('rated output') of 900 watts and an approximately 30-cm diameter turntable. After a period of substantially 2 minutes at full power, the crisp shapes underwent a transformation. They became airy and crispy, whereas the thickness and the diameter increased. On average, the thickness increased by substantially a factor 2 and the diameter by substantially a factor 1½.

Example 13

The following ingredients were put in a measuring jug of a blender, using lecithin as an emulsifier:
- 100 grams of paste of raw red salmon;
- 5 ml of liquid margarine;
- 15 ml of water.

These ingredients were then mixed into a smooth unity. Dome-shaped semi-finished products having a diameter of approximately 4 mm were formed on an approximately 30-cm diameter glass microwave oven dish. Said glass microwave oven dish with the semi-finished products placed thereon was then put in a household microwave oven with a power ('rated output') of 900 watts. After a period of substantially 3 minutes at full power, the dome-shaped semi-finished products underwent a transformation. They became airy and crispy, whereas the volume increased as well. On average, a linear augmentation by substantially a factor 2 was observed.

Example 14

The following ingredients were put in a measuring jug of a blender, without adding an emulsifier:
- 100 grams of paste of raw red salmon without skin;
- 5 ml of peanut oil;
- 15 ml of water These ingredients were then mixed into a smooth and substantially homogeneous mixture. Dome-shaped semi-finished products having a diameter of 4 mm were formed on an approximately 30-cm diameter glass microwave oven dish. Said glass microwave oven dish with the semi-finished products placed thereon was then put in a household microwave oven with a power ('rated output') of 900 watts. After a period of substantially 3 minutes at full power, the dome-shaped semi-finished products did not undergo a transformation. They did not become airy and crispy, whereas the volume did not increase either. On the contrary, the diameter of the dome-shaped semi-finished products had shrunk to an average of approximately 2 mm.

Example 15

The following ingredients were put in a measuring jug of a blender, using lecithin as an emulsifier:
- 100 grams of paste of raw tuna;
- 5 ml of liquid margarine;
- 20 ml of water.

These ingredients were then mixed into a smooth and substantially homogeneous mixture. Dome-shaped semi-finished products having a diameter of approximately 10 mm were formed on an approximately 30-cm diameter silicon surface. These semi-finished products were subsequently put in a microwave oven with a power ('rated output') of 900 watts and an approximately 30-cm diameter turntable. After a period of substantially 4 minutes at full power, the dome-shaped semi-finished products underwent a transformation. They became airy and crispy, whereas an increase in volume also occurred. On average, a linear augmentation by substantially a factor 2 was observed.

Example 16

The following ingredients were put in a measuring jug of a blender, using lecithin as an emulsifier:
- 100 grams of paste of raw low-fat pork;
- 5 ml of liquid margarine;
- 20 ml of water.

These ingredients were then mixed into a smooth and substantially homogeneous mixture. Dome-shaped semi-finished products having a diameter of approximately 10 mm were formed on an approximately 30-cm diameter silicon surface. These semi-finished products were subsequently put in a microwave oven with a power ('rated output') of 900 watts and an approximately 30-cm diameter turntable. After a period of 4 minutes at full power, the dome-shaped semi-finished products underwent a transformation. They became airy and firmly crisp, whereas the volume also increased. On average, a linear augmentation by substantially a factor 1.2 was observed.

Preparation of Carbohydrate Products

In the preparation of carbohydrate products, the standard protocol described above is concentrated on carbohydrates. The carbohydrate-containing (starting) material was first boiled and then reduced into a paste. Optionally a further (boiled, dried or fresh) vegetable material is added to it. Said paste can then be temporarily stored. Said paste is put in the blender, after which subsequently (during blending) oil and/or margarine optionally including an emulsifier are added. Subsequently the water is added in steps while mixing. In this case it also applies that the boiled (vegetable) material (such as potatoes, oats) in particular does not comprise any other additives such as added protein powders and/or added starch powders. Optionally an extra ingredient can be added, see for instance examples 19 and 31. Also in this method of preparation, the last step always is adding water in steps.

Example 17

The following ingredients were put in a measuring jug of a blender, using lecithin as an emulsifier:
- 100 grams of boiled potatoes;
- 10 ml of liquid margarine;
- 5 ml of water.

These ingredients were then mixed into a smooth and substantially homogeneous mixture. Dome-shaped semi-finished products having a diameter of approximately 10 mm were formed on a 30-cm diameter Teflon surface. These semi-finished products were subsequently put in a microwave oven with a power ('rated output') of 900 watts and an approximately 30-cm diameter turntable. After a period of 4 minutes at full power, the dome-shaped semi-finished products underwent a transformation. They became airy and firmly crisp, whereas the volume also increased. On average, a linear augmentation by substantially a factor 1.2 was observed.

Example 18

The following ingredients were put in a measuring jug of a blender, using lecithin as an emulsifier:
- 100 grams of boiled oats, biological and gluten-free;
- 10 ml of liquid margarine;
- 5 ml of water.

These ingredients were then mixed into a smooth and substantially homogeneous mixture. 12 crisp shapes having a diameter of approximately 30 cm were formed on a 30-cm diameter silicon surface. These crisp shapes were subsequently put in a microwave oven with a power ('rated output') of 900 watts and an approximately 30-cm diameter turntable. After a period of 2 minutes at full power, the dome-shaped semi-finished products underwent a transformation. They became airy and firmly crisp, whereas the volume also increased. On average, a linear augmentation by substantially a factor 1.2 was observed.

Example 19

The following ingredients were put in a measuring jug of a blender, using lecithin as an emulsifier:
- 100 grams of boiled potatoes;
- 50 grams of sweet/sour pickles;
- 10 ml of liquid margarine;
- 10 ml of creme fraiche;
- 10 ml of water.

These ingredients were then mixed into a smooth and substantially homogeneous mixture. 10 crisp shapes having a thickness of approximately 1 mm at a diameter of approximately 20 mm were formed on an approximately 30-cm diameter silicon surface. These crisp shapes were subsequently put in a household microwave oven with a power ('rated output') of 900 watts and an approximately 30-cm diameter turntable. After a period of substantially 2 minutes at full power, the crisp shapes underwent a transformation. They became airy and crispy, whereas the thickness and the diameter increased. On average, the thickness increased by substantially a factor 2 and the diameter by substantially a factor 1½.

Example 20

The following ingredients were put in a measuring jug of a blender, using lecithin as an emulsifier:
- 100 grams of boiled potatoes;
- 50 grams of reduced tomatoes;
- 10 grams of liquid margarine;
- 15 ml of water.

These ingredients were then mixed into a smooth and substantially homogeneous mixture. 8 mini cracker shapes having a thickness of approximately 3 mm at a length of approximately 50 mm and a width of approximately 25 mm were formed on an approximately 30-cm diameter silicon surface. These mini crackers were subsequently put in a household microwave oven with a power ('rated output') of 900 watts and an approximately 30-cm diameter turntable. After a period of substantially 3 minutes at full power, the mini crackers underwent a transformation. They became airy and crispy, whereas the dimensions increased. On average, the dimensions increased by substantially a factor 1½.

Example 21

The following ingredients were put in a measuring jug of a blender, using lecithin as an emulsifier:
- 100 grams of boiled potatoes;
- 50 grams of dried tomatoes;
- 15 grams of liquid margarine;
- 5 ml of water.

These ingredients were then mixed into a smooth and substantially homogeneous mixture. 10 triangular shapes having a thickness of approximately 2 mm and with sides having a length of approximately 25 mm×25 mm×25 mm were formed on an approximately 30-cm diameter silicon surface. These triangular shapes were subsequently put in a household microwave oven with a power ('rated output') of 900 watts and an approximately 30-cm diameter turntable. After a period of substantially 3 minutes at full power, the triangular shapes underwent a transformation. They became airy and crispy, whereas the dimensions increased. On average, the dimensions increased by substantially a factor 1½.

Example 22

The following ingredients were put in a measuring jug of a blender, using lecithin as an emulsifier:
- 100 grams of boiled potatoes;
- 50 grams of reduced leek;
- 15 grams of liquid margarine;
- 20 ml of water.

These ingredients were then mixed into a smooth and substantially homogeneous mixture. 4 cracker shapes having a thickness of approximately 4 mm at a length of approximately 75 mm and a width of 50 mm were formed on an approximately 30-cm diameter silicon surface. These crackers were subsequently put in a household microwave oven with a power ('rated output') of 900 watts and an approximately 30-cm diameter turntable. After a period of substantially 4 minutes at full power, the crackers underwent a transformation. They became airy and crispy, whereas the dimensions increased. On average, the dimensions increased by substantially a factor 1½.

Example 23

The following ingredients were put in a measuring jug of a blender, using lecithin as an emulsifier:
- 100 grams of boiled potatoes;
- 50 grams of reduced onions;
- 15 grams of liquid margarine;
- 15 ml of water.

These ingredients were then mixed into a smooth and substantially homogeneous mixture. 4 cracker shapes having a thickness of approximately 4 mm at a length of approximately 80 mm and a width of 50 mm were formed on an approximately 30-cm diameter Teflon surface. These crackers were subsequently put in a household microwave oven with a power ('rated output') of 900 watts and an approximately 30-cm diameter turntable. After a period of substantially 4 minutes at full power, the crackers underwent a transformation. They became airy and crispy, whereas the dimensions increased. On average, the dimensions increased by substantially a factor 1½.

Example 24

The following ingredients were put in a measuring jug of a blender, using lecithin as an emulsifier:
- 100 grams of boiled potatoes;
- 10 grams of dried green olives;
- 10 grams of liquid margarine;
- 10 ml of water.

These ingredients were then mixed into a smooth and substantially homogeneous mixture. The mixture was put in a pastry bag with an approximately 4-mm diameter nozzle. This bag was used to pipe 15 small domes having a diameter of approximately 10 mm on an approximately 30-cm diameter Teflon surface. These small domes were subsequently put in a household microwave oven with a power ('rated output') of 900 watts and an approximately 30-cm diameter turntable. After a period of substantially 2 minutes at full power, the small domes underwent a transformation. They became airy and crispy, whereas the dimensions increased. On average, the dimensions increased by substantially a factor 1½.

Example 25

The following ingredients were put in a measuring jug of a blender, using lecithin as an emulsifier:
- 100 grams of boiled potatoes;
- 60 grams of dried blue berries;
- 10 grams of liquid margarine;
- 5 ml of water.

These ingredients were then mixed into a smooth and substantially homogeneous mixture. 15 crisp shapes having a thickness of approximately 1 mm at a diameter of approximately 25 mm were formed on an approximately 30-cm diameter silicon surface. These crisp shapes were subsequently put in a household microwave oven with a power ('rated output') of 900 watts and an approximately 30-cm diameter turntable. After a period of substantially 2 minutes at full power, the crisp shapes underwent a transformation. They became airy and crispy, whereas the thickness and the diameter increased. On average, the thickness increased by substantially a factor 2 and the diameter by substantially a factor 1½.

Example 26

The following ingredients were put in a measuring jug of a blender, using lecithin as an emulsifier:
- 100 grams of boiled potatoes;
- 50 grams of fresh strawberries;
- 15 grams of liquid margarine;
- 10 ml of water.

These ingredients were then mixed into a smooth and substantially homogeneous mixture. 12 crisp shapes having a thickness of approximately 2 mm at a diameter of approximately 25 mm were formed on an approximately 30-cm diameter silicon surface. These crisp shapes were subsequently put in a household microwave oven with a power ('rated output') of 900 watts and an approximately 30-cm diameter turntable. After a period of substantially 3 minutes at full power, the crisp shapes underwent a transformation. They became airy and crispy, whereas the thickness and the diameter increased. On average, the thickness increased by substantially a factor 2 and the diameter by substantially a factor 1½.

Example 27

The following ingredients were put in a measuring jug of a blender, using lecithin as an emulsifier:
- 100 grams of boiled potatoes;
- 8 grams of dried sea lettuce (Ulva latuca);
- 10 grams of liquid margarine;
- 5 ml of water.

These ingredients were then mixed into a smooth and substantially homogeneous mixture. 8 mini cracker shapes having a thickness of approximately 2 mm at a length of approximately 40 mm and a width of 25 mm were formed on an approximately 30-cm diameter silicon surface. These mini crackers were subsequently put in a household microwave oven with a power ('rated output') of 900 watts and an approximately 30-cm diameter turntable. After a period of substantially 3 minutes at full power, the mini cracker shapes underwent a transformation. They became airy and crispy, whereas the dimensions increased. On average, the dimensions increased by substantially a factor 1½.

Example 28

The following ingredients were put in a measuring jug of a blender, using lecithin as an emulsifier:
- 100 grams of boiled potatoes;
- 10 grams of dried nori (Porpyra);
- 10 grams of liquid margarine;
- 5 ml of water.

These ingredients were then mixed into a smooth and substantially homogeneous mixture. 12 crisp shapes having a thickness of approximately 2 mm with a diameter of approximately 25 mm were formed on an approximately 30-cm diameter Teflon surface. These crisp shapes were subsequently put in a household microwave oven with a power ('rated output') of 900 watts and an approximately 30-cm diameter turntable. After a period of substantially 3 minutes at full power, the crisp shapes underwent a transformation. They became airy and crispy, whereas the dimensions increased. On average, the thickness increased by substantially a factor 2 and the diameter by substantially a factor 1½.

Example 29

The following ingredients were put in a measuring jug of a blender, using lecithin as an emulsifier:
- 100 grams of boiled quinoa;
- 10 ml of liquid margarine;
- 20 ml of melted cheese;
- 5 ml of water.

These ingredients were then mixed into a smooth and substantially homogeneous mixture. 10 crisp shapes having a thickness of approximately 1 mm at a diameter of approximately 30 mm were formed on an approximately 30-cm diameter silicon surface. These crisp shapes were subsequently put in a household microwave oven with a power ('rated output') of 900 watts and an approximately 30-cm diameter turntable. After a period of substantially 2 minutes at full power, the crisp shapes underwent a transformation. They became airy and crispy, whereas the thickness and the diameter increased. On average, the thickness increased by substantially a factor 2 and the diameter by substantially a factor 1½.

Example 30

The following ingredients were put in a measuring jug of a blender, using lecithin as an emulsifier:
- 100 grams of boiled potatoes;
- 50 grams of yoghurt;
- 15 grams of liquid margarine;
- 10 ml of water.

These ingredients were then mixed into a smooth and substantially homogeneous mixture. 10 triangular shapes having a thickness of approximately 2 mm and sides of approximately 25 mm×25 mm×25 mm were formed on an approximately 30-cm diameter silicon surface. These triangular shapes were subsequently put in a household microwave oven with a power ('rated output') of 900 watts and an approximately 30-cm diameter turntable. After a period of substantially 3 minutes at full power, the triangular shapes underwent a transformation. They became airy and crispy, whereas the dimensions increased. On average, the dimensions increased by substantially a factor 1½.

Example 31

The following ingredients were put in a measuring jug of a blender, using lecithin as an emulsifier:
- 100 grams of boiled potatoes;
- 50 grams of vanilla cream cheese;
- 10 grams of liquid margarine;
- 10 ml of water.

These ingredients were then mixed into a smooth and substantially homogeneous mixture. 10 triangular shapes having a thickness of approximately 2 mm and with sides having a length of approximately 25 mm×25 mm×25 mm were formed on an approximately 30-cm diameter silicon surface. These triangular shapes were subsequently put in a household microwave oven with a power ('rated output') of 900 watts and an approximately 30-cm diameter turntable. After a period of substantially 3 minutes at full power, the triangular shapes underwent a transformation. They became airy and crispy, whereas the dimensions increased. On average, the dimensions increased by substantially a factor 1½.

Example 32

The following ingredients were put in a measuring jug of a blender, using lecithin as an emulsifier:
- 100 grams of boiled potatoes;
- 50 grams of dried tomatoes;
- 15 grams of liquid margarine;
- 10 ml of water.

These ingredients were then mixed into a smooth and substantially homogeneous mixture. 1 circular shape having a thickness of approximately 3 mm at a diameter of approximately 200 mm was formed on an approximately 30-cm diameter Teflon surface. This circular shape was subsequently put in a household microwave oven with a power ('rated output') of 900 watts and an approximately 30-cm diameter turntable. After a period of substantially 4 minutes at full power, the circular shape underwent a transformation. It became airy and crispy, whereas the dimensions increased. On average, the dimensions increased by substantially a factor 1½.

Further Adaptations of the Experiments According to Examples 1-32

All the experiments mentioned in the above examples were also carried out using a microwave oven with a power ('rated output') of 700 watts. The end results were substantially identical to the end results obtained using the microwave oven with a power of 900 watts. The experiments resulting in a brittle, crispy final product that had increased in volume, did require a longer heating time when using the microwave oven with a power of 700 watts than when using a microwave oven with a power of 900 watts. Also, when too much semi-finished product is heated at the same time, the expansion of the product can be too meager. Preferably up to a maximum of 20-30 grams (per part of the semi-finished product/portion) is heated in a microwave oven of approximately 700 watts. In further embodiments a maximum of 35-40 grams is heated. In particular, at least 1, such as at least 5 grams is heated in a microwave oven of approximately 700-1000 watts. In embodiments, a portion is heated using microwaves for a period of 10-300 seconds (5 minutes), in particular 30-240 seconds, such as 60-210 seconds.

All experiments described in the above-mentioned examples have also been carried out with semi-finished products comprising an oil-in-water (O/W) emulsion. The products did not puff, but baked and the final product did not increase in volume.

All experiments described in the above examples have also been carried out with a clingy basis. The semi-finished products then clung to their basis and no puff-effect occurred. The semi-finished products underwent little increase in volume and did not become airy and crispy. For the purpose of heating in the microwave oven, placing the semi-finished products on a non-clingy basis therefor has clear advantages. In the description and in the claims, a non-clingy basis is also referred to as a basis having non-stick properties. The polymer polytetrafluorethylene known under the trade name Teflon is an example of such a material having non-stick properties, just like for instance certain ceramic materials or siliconized baking paper. In an embodiment, the basis comprises silicones. In a further embodiment, the basis comprises fluorinated alkane (particularly a fluorinated polyolefin), such as in particular polytetrafluoroethylene.

All experiments described in the above examples have also been carried out with pastes comprising mixtures of different types of meat, chicken, fish and shrimps. All experiments described in the above examples have also been carried out with pastes comprising mixtures of different types of vegetables, tubers, cereals and dairy.

All experiments described in the above examples have also been carried out with pastes comprising mixtures of different types of meat, chicken, fish, shrimps, vegetables, tubers, cereals and dairy. With the correct mixing ratio of paste, water, oil and emulsifier an airy and crispy final product was created, and an increase of volume occurred. A linear augmentation by substantially a factor 2 was observed.

All experiments described in the above examples have also been carried out with pastes comprising mixtures of different types of meat, chicken, fish, shrimps, vegetables, tubers, cereals and dairy and wherein no extra water was added (in conformity with the method according to the invention). The semi-finished products did not puff, but baked and the final product did not increase in volume.

All successful tests resulting in a puffed, crispy final product, were also repeated without adding extra water. The results were products that did not show an increase of volume. Moreover, they were not crispy.

In addition to the ingredients mentioned above, experiments were carried out using fatter raw materials, such as fatty pork (having over 30% of fat), fatty fish (such as mackerel, salmon). The final products thereof were not crispy and showed no increase in volume either. Using chicken meat having a fat content of 20-25 wt % as a source of protein led to inconsistent results (with respect to airiness and crispiness).

If the starting materials contain large quantities of fat, it is preferable to remove the fat from this material first. In particular, first the fat is removed from starting material having over 20 wt %, in particular equaling or over 25 wt %, such as equaling or over 30 wt %, more in particular equaling or over 40 wt %. In an embodiment (animal) starting material having a fat percentage of 15 wt % at a maximum is used as a source of protein and first the fat is removed from the in particular fatter materials. If other materials are used simultaneously as a source of protein and/or carbohydrate, in embodiments the above percentages of fat (wherein preferably fat is removed) are higher.

The invention claimed is:

1. A method for preparing a food product, wherein the food product is a puffed food product that is puffed during the preparation, and wherein the method comprises
making a paste;
mixing a fat and an emulsifier into the paste thereby homogenizing the paste;
mixing water into the homogenized paste in such a way that, after having mixed the water, the paste comprises an emulsion and
using microwaves to heat the paste, thereby causing the paste to become puffed the paste having been divided into portions;
wherein said food product is selected from the group consisting of a carbohydrate product and a protein product,
wherein making said paste comprising processing a substance,
wherein processing said substance is selected from the group consisting of mixing said substance, grinding said substance, and a combination of mixing and grinding said substance,
wherein said substance is selected from the group consisting of fresh carbohydrate-containing material, a fresh protein-containing material, and a fresh-protein-and-fresh-carbohydrate-containing material,
wherein said fat is selected from the group consisting of an oil, a margarine, and a combination of an oil and a margarine,
wherein said emulsion is a water-in-oil emulsion that has a water concentration that exceeds a fat concentration thereof.

2. The method according to claim 1, wherein the method further comprises: baking the puffed paste in a conventional oven.

3. The method according to claim 1, wherein the protein-containing material comprises edible soft tissue from a vertebrate.

4. The method according to claim 1, further comprising adding vegetable material, wherein the vegetable material being an edible vegetable material that has been boiled.

5. The method according to claim 1, further comprising selecting the carbohydrate material to be potato.

6. The method according to claim 1, wherein the homogeneous paste comprises at least fifty percent by weight of potato.

7. The method according to claim 1, wherein each portion into which the paste is divided has a lineal dimension between one millimeter and three hundred millimeters and a mass between one gram and three hundred grams.

8. The method according to claim 1, wherein each portion into which the paste is divided has a lineal dimension between one millimeter and forty millimeters and a volume between one cubic millimeter and fifty cubic millimeters, and wherein using microwaves to heat the paste comprises using a microwave oven.

9. The method according to claim 1, wherein the food product has no more than five percent by weight of fat.

10. The method according to claim 1, wherein the emulsifier has an HLB value of at most 10.

11. The method according to claim 1, wherein the emulsifier has an HLB value of at most 8.

12. The method according to claim 1, wherein, while using microwaves to heat the paste, the portions of paste comprising the water-in-oil emulsion are placed on a non-stick basis.

13. The method according to claim 1, wherein the paste comprises between twenty and forty milliliters of water and between five and twenty milliliters of fat for each hundred grams of the substance.

14. The method of according to claim 1, wherein the protein-containing material comprises edible soft tissue from an invertebrate.

15. The method of according to claim 1, wherein the carbohydrate-containing material comprises edible vegetable material.

* * * * *